(12) United States Patent
Klinkhammer et al.

(10) Patent No.: US 11,117,233 B2
(45) Date of Patent: Sep. 14, 2021

(54) TOOL MAGAZINES OF MECHANICAL ARRANGEMENTS AND METHODS FOR ADMINISTERING TOOLS

(71) Applicant: TRUMPF Werkzeugmaschinen GmbH + Co. KG, Ditzingen (DE)

(72) Inventors: Marc Klinkhammer, Ditzingen (DE); Stefan Kerscher, Walzbachtal (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 16/845,768

(22) Filed: Apr. 10, 2020

(65) Prior Publication Data

US 2020/0238461 A1 Jul. 30, 2020

Related U.S. Application Data

(63) Continuation of application No. 16/356,196, filed on Mar. 18, 2019, now Pat. No. 10,639,755, which is a
(Continued)

(30) Foreign Application Priority Data

Oct. 26, 2012 (EP) ..................................... 12190087

(51) Int. Cl.
*B21D 37/14* (2006.01)
*B23Q 3/155* (2006.01)
(Continued)

(52) U.S. Cl.
CPC ....... *B23Q 3/15526* (2013.01); *B21D 37/145* (2013.01); *B23Q 3/15539* (2016.11);
(Continued)

(58) Field of Classification Search
CPC .............. B23Q 3/1572; B23Q 3/15724; B23Q 3/15726; B23Q 3/15733; B23Q 3/1574;
(Continued)

(56) References Cited

U.S. PATENT DOCUMENTS

| | | | |
|---|---|---|---|
| 4,574,464 A * | 3/1986 | Lodetti | B23H 7/26 408/35 |
| 4,620,363 A | 11/1986 | Mitsukuchi et al. | |

(Continued)

FOREIGN PATENT DOCUMENTS

| | | |
|---|---|---|
| CN | 202278105 | 6/2012 |
| CN | 102601245 | 7/2012 |

(Continued)

*Primary Examiner* — Erica E Cadugan
*Assistant Examiner* — Michael Vitale
(74) *Attorney, Agent, or Firm* — Fish & Richardson P.C.

(57) ABSTRACT

A tool magazine for tools of a machine tool for processing workpieces includes a first magazine unit that is close to a processing station of the machine tool and a second magazine unit that is remote from the processing station of the machine tool. The second magazine unit includes a permanent tool carrier and a temporary tool carrier. The permanent tool carrier is permanently accessible to a tool handling device. The temporary tool carrier is temporarily accessible to the tool handling device.

10 Claims, 8 Drawing Sheets

Related U.S. Application Data continuation of application No. 14/060,865, filed on Oct. 23, 2013, now Pat. No. 10,245,693.

(51) Int. Cl.
*B21D 28/00* (2006.01)
*B21D 43/00* (2006.01)

(52) U.S. Cl.
CPC ............ *B21D 28/00* (2013.01); *B21D 43/003* (2013.01); *B23Q 2003/15537* (2016.11); *Y10T 483/16* (2015.01); *Y10T 483/1731* (2015.01); *Y10T 483/1845* (2015.01); *Y10T 483/1855* (2015.01); *Y10T 483/1891* (2015.01)

(58) Field of Classification Search
CPC ............ B23Q 3/15746; B23Q 3/15753; B23Q 3/1576; B23Q 3/15766; B21D 37/145; Y10T 483/1729; Y10T 483/1731; Y10T 483/1845; Y10T 483/1855; Y10T 483/1873; Y10T 483/1891
USPC ............................. 483/28, 29, 63, 64, 66, 68
See application file for complete search history.

(56) References Cited

U.S. PATENT DOCUMENTS

| | | | |
|---|---|---|---|
| 4,920,632 A | 5/1990 | Babel | |
| 4,951,375 A | 8/1990 | Erlennnaier | |
| 5,168,745 A * | 12/1992 | Miyagawa | B21D 5/02 483/29 |
| 5,176,604 A | 1/1993 | Sakannura et al. | |
| 5,224,915 A | 7/1993 | Kilian | |
| 5,320,595 A * | 6/1994 | Hirata | B21D 28/12 483/29 |
| 5,342,276 A | 8/1994 | Fujiwara et al. | |
| 5,478,300 A | 12/1995 | McMurty | |
| 5,669,866 A | 9/1997 | Julian et al. | |
| 5,882,285 A | 3/1999 | Seto et al. | |
| 6,024,681 A | 2/2000 | Latten et al. | |
| 6,071,220 A | 6/2000 | Sugihara et al. | |
| 6,350,222 B2 | 2/2002 | Susnjara | |
| 6,416,450 B2 | 7/2002 | Susnjara | |
| 9,199,296 B2 * | 12/2015 | Busch | B21D 43/003 |
| 10,245,693 B2 | 4/2019 | Klinkhammer et al. | |
| 10,639,755 B2 | 5/2020 | Klinkhammer et al. | |
| 2011/0308362 A1 | 12/2011 | Buettner et al. | |
| 2012/0100974 A1 | 4/2012 | Busch | |
| 2015/0174633 A1* | 6/2015 | Sato | B21D 37/145 483/1 |
| 2019/0217433 A1 | 7/2019 | Klinkhammer et al. | |

FOREIGN PATENT DOCUMENTS

| | | | |
|---|---|---|---|
| DE | G 87 16 086.2 | 3/1988 | |
| DE | 19643163 A1 * | 4/1998 | B30B 15/028 |
| EP | 0 648 556 | 4/1995 | |
| JP | 56-157934 | 12/1981 | |
| JP | 56-163856 | 12/1981 | |
| JP | 61-50743 | 3/1986 | |
| JP | 62-57717 | 3/1987 | |
| JP | 02251322 A * | 10/1990 | |
| JP | 2001-109046 | 4/2001 | |
| JP | 2012-513308 | 6/2012 | |
| KR | 1020110071214 | 6/2011 | |

* cited by examiner

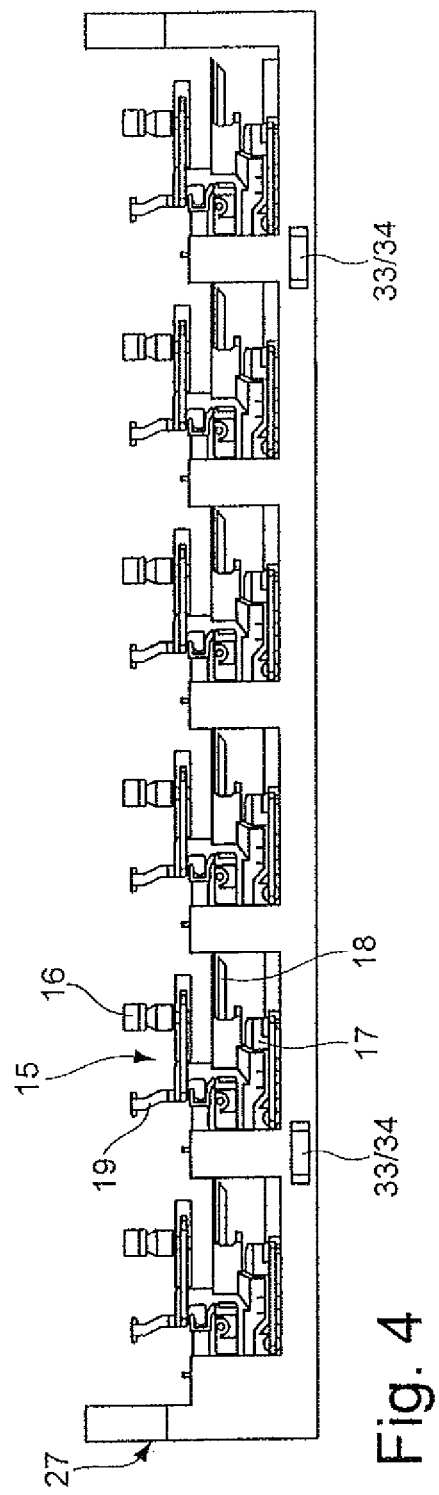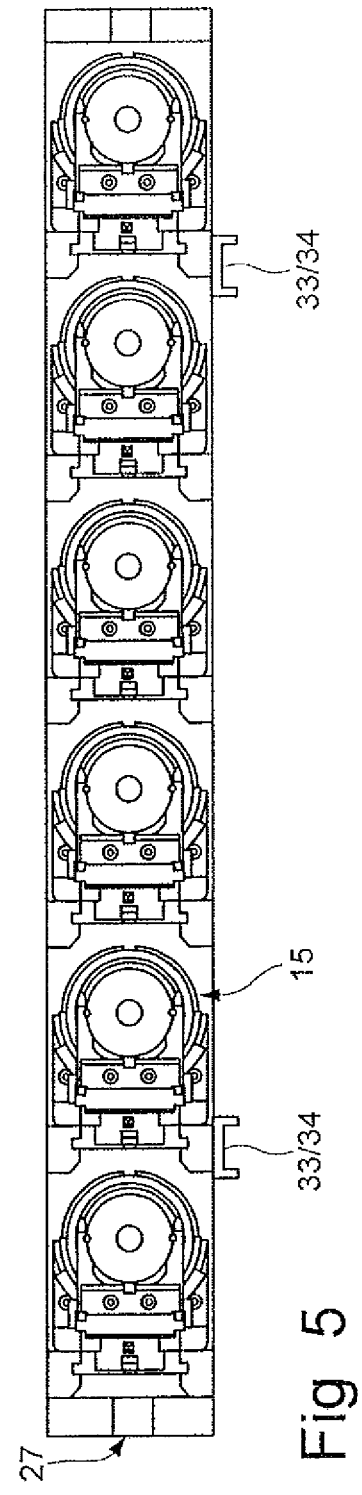

TOOL MAGAZINES OF MECHANICAL ARRANGEMENTS AND METHODS FOR ADMINISTERING TOOLS

CROSS-REFERENCE TO RELATED APPLICATION

This application is a continuation of and claims priority under 35 U.S.C. § 120 to U.S. application Ser. No. 16/356,196, filed on Mar. 18, 2019, which claims priority to U.S. application Ser. No. 14/060,865, filed on Oct. 23, 2013, now U.S. Pat. No. 10,245,693, which claims priority to European Application No. 12 190 087.2, filed on Oct. 26, 2012. The contents of these priority applications are hereby incorporated by reference in their entirety.

TECHNICAL FIELD

The present disclosure relates to tool magazines that store tools of machine tools for processing workpieces (e.g., metal sheets) and that have magazine units that are close to processing stations of the machine tools and that have magazine units that are remote from the processing stations of the machine tools.

BACKGROUND

A turret type punching press for processing metal sheets may have an O-shaped machine frame. A coordinate guide for the metal sheets to be processed and a tool turret acting as a tool magazine's magazine unit which is close to the station are accommodated in the inner space of the frame. The tool turret can be rotated about a vertical axis and is provided along the periphery thereof with multiple storage locations for punching tools. Owing to a positioning movement of the tool turret about the vertical rotation axis, the punching tool required for the workpiece processing operation to be carried out is positioned on a processing station of the turret punching press. The storage locations of the tool turret are supplied by a tool transfer device with the punching tools for the imminent workpiece processing operation. Punching tools which are no longer required are removed from the tool turret by the tool transfer device, and punching tools which are required are transferred to the tool turret by the tool transfer device. In this instance, the tool transfer device in addition to the tool turret travels to a magazine unit of the tool magazine of the turret type punching press, which magazine unit is remote from the station with spacing from the turret. The magazine unit which is remote from the station is located in a frame chamber which is open in the direction towards a longitudinal side of the machine frame of the turret punching press. The storage capacity of the magazine unit remote from the station is greatly limited owing to spatial conditions. Owing to the small number of storage locations available in the magazine unit remote from the station, the magazine unit remote from the station often has to be retrofitted or refitted so that the tool turret which is close to the station can be provided with the required punching tools from the magazine unit remote from the station.

In some instances, a magazine unit which is remote from the station is arranged in the close vicinity of a punching machine having a mono punching head and having a linear magazine which is provided as a magazine unit close to the station on a transverse rail of a coordinate guide. The magazine unit is remote from the station and has a disc-like tool carrier, which is orientated in a horizontal manner and which can be positioned about a vertical rotation axis. At the upper side thereof, the disc-like tool carrier has storage locations for punching tools, which are arranged in several concentric rows about the rotation axis. A pivot arm of a tool transfer device has permanent access to the tool storage locations of the disc-like tool carrier and transfers the relevant punching tools between the linear magazine of the punching machine close to the station and the disc-like tool carrier of the magazine unit which is remote from the station. In particular owing to the disc-like tool carrier, the magazine unit which is remote from the station requires a relatively large installation surface-area.

SUMMARY

Certain aspects of the present disclosure allow a processing station of a machine tool to be supplied with required tools in an efficient manner, with a compact structure of the machine tool.

In one aspect of the invention, a tool magazine for tools of a machine tool for processing workpieces includes a first magazine unit that is close to a processing station of the machine tool and a second magazine unit that is remote from the processing station of the machine tool. The first magazine unit is provided for tools that are transferred from the first magazine unit to the processing station of the machine tool and/or for tools that are transferred from the processing station of the machine tool to the first magazine unit. The second magazine unit is provided for tools that are transferred from the second magazine unit to the first magazine unit for subsequent transfer to the processing station and/or for tools that are transferred from the first magazine unit to the second magazine unit after being transferred from the processing station. The second magazine unit includes a permanent tool carrier and a temporary tool carrier, the permanent tool carrier and the temporary tool carrier having storage locations for the tools that are transferred from the second magazine unit to the first magazine unit and/or for tools that are transferred from the first magazine unit to the second magazine unit. The permanent tool carrier is permanently accessible to a tool handling device, and the temporary tool carrier is temporarily accessible to the tool handling device.

In another aspect of the invention, a mechanical arrangement for processing workpieces includes a machine tool that has a processing station to and from which tools can be transferred for a workpiece processing operation and a tool magazine that includes a first magazine unit that is close to the processing station of the machine tool and a second magazine unit that is remote from the processing station of the machine tool. The first magazine unit is provided for tools that are transferred from the first magazine unit to the processing station of the machine tool and/or for tools that are transferred from the processing station of the machine tool to the first magazine unit. The second magazine unit is provided for tools that are transferred from the second magazine unit to the first magazine unit for subsequent transfer to the processing station and/or for tools that are transferred from the first magazine unit to the second magazine unit after being transferred from the processing station. The second magazine unit includes a permanent tool carrier and a temporary tool carrier, the permanent tool carrier and the temporary tool carrier having storage locations for the tools that are transferred from the second magazine unit to the first magazine unit and/or for the tools that are transferred from the first magazine unit to the second magazine unit. The permanent tool carrier is permanently accessible to a tool handling device, and the temporary tool carrier is temporarily accessible to the tool handling device.

In another aspect of the invention, a method of administering tools for processing a workpiece on a mechanical arrangement includes transferring tools between a first magazine unit close to a processing station of the mechanical arrangement and a permanent tool carrier of a second magazine unit remote from the processing station of the mechanical arrangement and/or between the first magazine unit and a temporary tool carrier of the second magazine unit, and/or between the permanent tool carrier of the second magazine unit and the temporary tool carrier of the second magazine unit. The mechanical arrangement includes a machine tool that includes the processing station to and from which the tools can be transferred for a workpiece processing operation and a tool magazine that includes the first magazine unit and the second magazine unit. The first magazine unit is provided for tools that are transferred from the first magazine unit to the processing station of the machine tool and/or for tools that are transferred from the processing station of the machine tool to the first magazine unit. The second magazine unit is provided for tools that are transferred from the second magazine unit to the first magazine unit for subsequent transfer to the processing station and/or for tools that are transferred from the first magazine unit to the second magazine unit after being transferred from the processing station. The second magazine unit includes a permanent tool carrier and a temporary tool carrier, the permanent tool carrier and the temporary tool carrier having storage locations for the tools that are transferred from the second magazine unit to the first magazine unit and/or for the tools that are transferred from the first magazine unit to the second magazine unit. The permanent tool carrier is permanently accessible to a tool handling device, and the temporary tool carrier is temporarily accessible to the tool handling device.

The temporary tool carrier affords the possibility of configuring the second magazine unit which is remote from the processing station in a flexible manner. The storage capacity of the permanent tool carrier can be expanded by the temporary tool carrier as required. Tools can consequently be kept available even in relatively large numbers on the second magazine unit remote from the processing station. Therefore, the tools required for the processing station of the machine tool can also be provided at short notice when processing tasks with a large tool requirement are intended to be carried out. In the context of the tool administration, the tool handling device can selectively transfer tools between the first magazine unit close to the processing station and the permanent tool carrier of the second magazine unit remote from the processing station, between the first magazine unit close to the processing station and the temporary tool carrier of the second magazine unit remote from the processing station, or between the permanent and the temporary tool carriers of the second magazine unit remote from the processing station.

Tools for the processing station of the machine tool and/or tools removed from the processing station can be temporarily stored in particularly large numbers when multiple magazine units are provided remote from the processing station that have at least one permanent tool carrier and at least one temporary tool carrier. In this instance, it is possible to arrange a magazine unit remote from the processing station at each of mutually opposing sides of a frame of the machine tool.

In some embodiments, the second magazine unit remote from the processing station includes multiple temporary tool carriers. The various temporary tool carriers are selectively accessible to the tool handling device for removing and/or transferring tools. Such a tool magazine has a particularly large storage capacity. Furthermore, it affords the possibility of refitting or retrofitting the temporary tool carriers which do not currently have to be available to the tool handling device and thus preparing the second magazine unit which is remote from the processing station with the entire tool magazine for forthcoming processing tasks, without the current processes on the machine tool being disrupted or delayed.

In another advantageous embodiment, the accessibility of the temporary tool carriers to the tool handling device is connected to an operating position of the temporary tool carriers. In a non-operating position, the temporary tool carriers are not available to the tool handling device. The movements to be carried out by a temporary tool carrier into the operating position or the non-operating position can be controlled with a high level of precision in a simple manner. In the non-operating position, the relevant temporary tool carrier can in particular be refitted or retrofitted with tools. It is also possible to remove tools which are intended to be withdrawn from the tool stock of the tool magazine of the machine tool, for example, owing to wear, from the relevant temporary tool carrier when the latter is in a non-operating position.

A compact structure of the second magazine unit remote from the processing station is possible when the temporary tool carriers of the second magazine unit remote from the processing station can be moved from the non-operating position into the operating position and/or from the operating position into the non-operating position in a vertical direction. Since the temporary tool carriers carry out movements in a vertical direction, a relatively small base surface area is sufficient for the second magazine unit remote from the processing station.

In the interests of a high level of operational reliability of the tool transfer, the second magazine unit remote from the processing station can be arranged in the operating position in a defined manner with respect to the permanent tool carrier and/or with respect to the tool handling device. This feature ensures that the tool handling device can remove tools in an uninterrupted manner from the corresponding temporary tool carrier of the second magazine unit remote from the processing station or can transfer them to the appropriate temporary tool carrier.

A defined arrangement of a temporary tool carrier can be achieved with appropriate positioning precision of the devices used for the movement of the temporary tool carrier into the operating position, in particular by using corresponding drives, without additional auxiliary devices.

In order to ensure a defined arrangement of the temporary tool carriers with respect to the permanent tool carrier of the second magazine unit remote from the processing station and/or with respect to the tool handling device, an activatable and deactivatable positioning device can be provided. The positioning device is activated when the appropriate temporary tool carrier is available to the tool handling device. Otherwise, for example, to transfer the temporary tool carrier into the non-operating position, the positioning device is deactivated. There are various possibilities for the structural configuration of the positioning device. For example, there may be provided between the permanent tool carrier and a temporary tool carrier which is available to the tool handling device a switchable magnet connection, via which the temporary tool carrier is connected to the permanent tool carrier for the duration of its availability to the tool handling device. It is also conceivable to have for the temporary tool carriers a specific guide which becomes effective when a temporary tool carrier moves into the operating position thereof. Such a guide may be formed, for example, as a slotted guide member.

In order to move the temporary tool carriers of the second magazine unit remote from the station into the operating position and/or into the non-operating position, there is provided in some embodiments a conveying system that may be driven in a motorized manner. Such a conveying system may also move multiple temporary tool carriers together. With the transfer of a temporary tool carrier into the operating position, another temporary tool carrier can be moved into the non-operating position. Advantageously, the driven conveying system may be constructed as a continuously rotating conveying system. Continuously rotating conveying system may include continuously rotating conveyor chains or continuously rotating conveyor belts.

A large number of tools can be kept available in a tight space when the second magazine unit remote from the station includes a rotating magazine. In order to ensure operationally reliable transfer into the operating position and/or into the non-operating position, the temporary tool carriers are guided on a carrier structure of the rotating magazine. In order to prevent imbalances during the rotation of temporary tool carriers, it is recommended to distribute the tools in the most uniform manner possible over the temporary tool carriers. In order to guide the temporary tool carriers on the carrier structure of the rotating magazine, it is possible to use, for example, the above-mentioned continuously rotating conveying system. Alternatively, it is also possible to provide, for example, rotating carrier discs on which the temporary tool carriers are journalled.

Owing to a particularly small base surface area, a rotating magazine of the second magazine unit remote from the processing station is distinguished if it is at least partially constructed as a paternoster (i.e., an elevator or lift including components that move up and down along a chain or loop). Multiple gondolas may be fitted, in particular so as to be suspended, as temporary tool carriers to a continuously rotating conveying system which is guided on a carrier structure of the paternoster in a vertical movement direction. Each of the gondolas may have multiple storage locations for tools. The rotating conveying system of the paternoster can also be guided outside the lift-like paternoster in a horizontal direction and/or can be redirected several times. In this manner, it is possible to provide for the second magazine unit remote from the processing station a rotating magazine with a particularly large storage capacity. A gondola preferably travels into the operating position thereof in the portion of the rotating magazine which is in the form of a paternoster.

In some embodiments, the tool magazine of the machine tool is formed, for example, by a linear magazine which is provided as a first magazine unit close to the processing station and a second magazine unit which is remote from the processing station having a permanent tool carrier and at least one temporary tool carrier. Using the tool handling device, tools can in particular be transferred between the first magazine unit close to the processing station, (e.g., optionally, the linear magazine close to the processing station) and the second magazine unit remote from the processing station.

Regardless of the structure of the first magazine unit close to the processing station, there is the possibility for the tool handling device on the second magazine unit remote from the processing station to selectively access the permanent tool carrier or the temporary tool carriers which are also accessible for the tool handling device. If the permanent tool carrier of the second magazine unit remote from the processing station is arranged closer to the first magazine unit close to the processing station than the temporary tool carriers which are accessible to the tool handling device, it is recommended, in the interests of the most rapid transfer possible of tools to the first magazine unit close to the processing station, to keep the tools available which are required to perform the next processing operation on the permanent tool carrier of the second magazine unit remote from the processing station.

If processing operations are further intended to be carried out successively on the machine tool, for which different tool sets are required, then the first magazine unit which is close to the processing station and therewith also the second magazine unit remote from the processing station, from which the first magazine unit close to the processing station is charged with the required tools, is intended to be continuously retrofitted or refitted. When tools are transferred between the first magazine unit close to the processing station and the second magazine unit remote from the processing station, the tools required for the following processing operation and/or a sufficient number of free storage locations for tools no longer required on the first magazine unit close to the processing station should be available on the permanent tool carrier of the second magazine unit remote from the processing station. A corresponding configuration of the permanent tool carrier of the second magazine unit remote from the processing station is achieved while a workpiece is being processed at the processing station of the machine tool.

Other aspects, features, and advantages will be apparent from the description, the drawings, and the claims.

DESCRIPTION OF DRAWINGS

FIG. 4 shows a side view of a temporary tool carrier of the tool magazine unit according to FIG. 3.

FIG. 5 shows a plan view of the temporary tool carrier according to FIG. 4.

DETAILED DESCRIPTION

Figure 1:
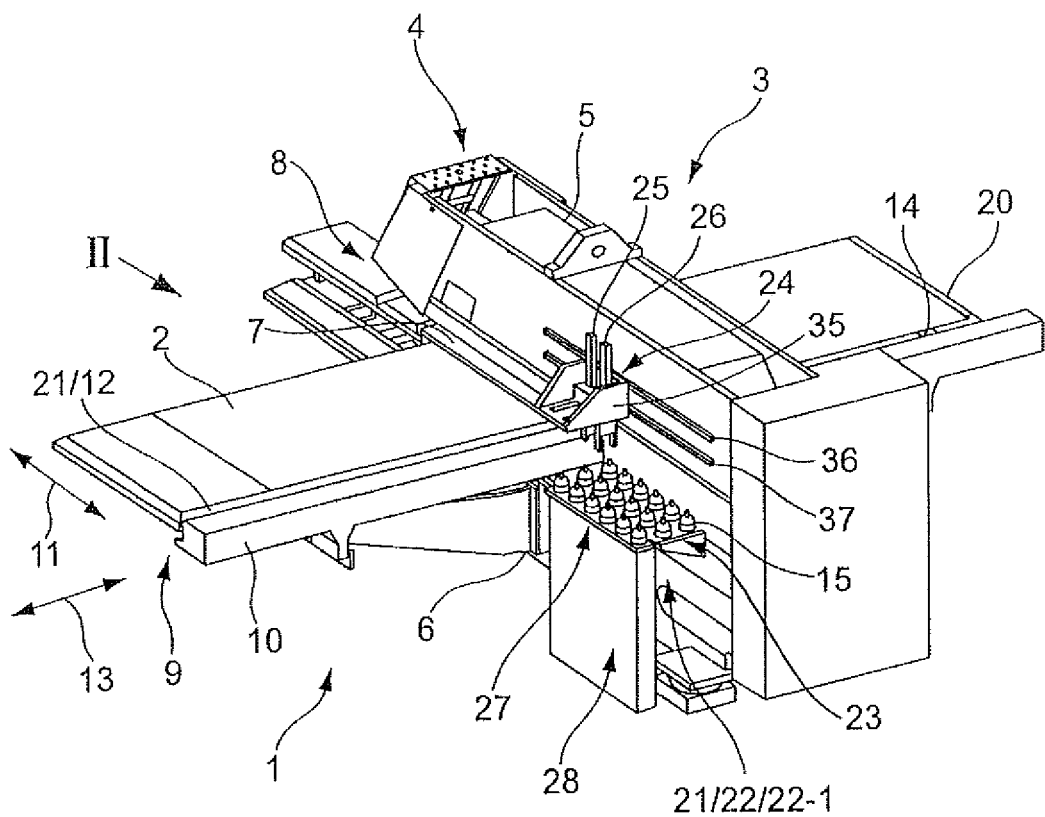
FIG. 1 shows a perspective view of a mechanical arrangement for punch processing sheet metal that includes a punching machine and a tool magazine that has a first embodiment of a magazine unit that is remote from the punching station.

According to FIGS. 1 to 3 and 5 to 8, a mechanical arrangement 1 for punch processing metal sheets 2 includes as a machine tool a punching machine 3. The punching machine 3 has a C-shaped machine frame 4 having an upper frame leg 5, a lower frame leg 6, and an intermediate leg space 7 which is formed between the upper frame leg 5 and the lower frame leg 6. At the free ends of the upper frame leg 5 and the lower frame leg 6, there is located as a processing station of the punching machine 3 a punching station 8 having an upper tool receiving member on the upper frame leg 5 and a lower tool receiving member on the lower frame leg 6.

A coordinate guide 9 for positioning metal sheets 2 is accommodated in the intermediate leg space 7 of the machine frame 4. The coordinate guide 9 includes a transverse guide 10, which is movably guided on the lower frame leg 6 in the longitudinal direction of the machine frame 4 and which can move in the direction of a double-headed arrow 11 in a motor-driven manner.

Figure 2:
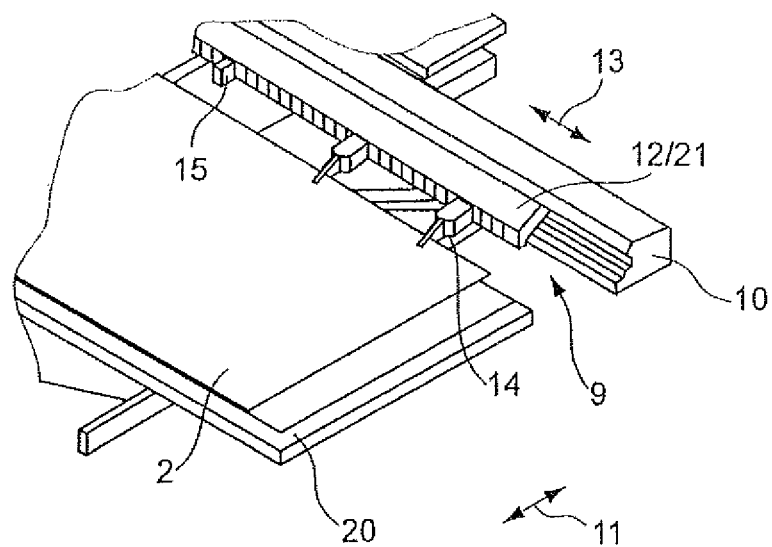
FIG. 2 shows a perspective view of a portion of the mechanical arrangement according to FIG. 1, when viewed in the direction of the arrow II in FIG. 1.

The transverse guide 10 itself guides a transverse rail 12 which is provided at the side of the transverse guide 10 remote from the observer of FIGS. 1, 3, and 6 to 9, and which can be seen in FIG. 2. The transverse rail 12 is partially arranged in the intermediate leg space 7 of the machine frame 4 and can be moved along the transverse guide 10 in a motor-driven manner in the direction of a double-headed arrow 13. The transverse rail 12 is provided with clamping claws 14 for fixing metal sheets 2 and, furthermore, with storage locations for punching tools 15 which are provided as tools for metal sheet processing.

According to FIGS. 4 and 5, the punching tools 15 which are illustrated schematically in the remaining drawings include as an upper tool a punching stamp 16, as a lower tool a punching die 17, and furthermore a stripper 18. The individual components of each of the punching tools 15 are accommodated in a tool cartridge 19. The tool cartridge 19 is manipulated in order to access a respective punching tool 15.

Only two of the clamping claws 14 of the coordinate guide 9 are indicated in FIG. 2. Using the clamping claws 14, a metal sheet 2 to be processed is fixed to the coordinate guide 9. Owing to the movability of the transverse guide 10 in the direction of the double-headed arrow 11 and the movability of the transverse rail 12 in the direction of the double-headed arrow 13, the metal sheet 2 retained by the clamping claws 14 can be moved by the coordinate guide 9 in a horizontal movement plane defined by the double-headed arrows 11, 13. Such movements of a metal sheet 2 are carried out in order to position the metal sheet 2 with respect to the punching station 8 of the punching machine 3 for processing operations or to move the metal sheet 2 relative to the punching station 8 during a punch processing operation. During its movement, the metal sheet 2 is supported on a stationary workpiece table 20 of the punching machine 3.

With the storage locations for punching tools 15, the transverse rail 12 of the coordinate guide 9 forms a magazine unit of a tool magazine 21 of the mechanical arrangement 1, which magazine unit is arranged close to the punching station 8. In addition to the transverse rail 12, the tool magazine 21 of the mechanical arrangement 1 includes a magazine unit 22 remote from the punching station 8. The magazine unit 22 is spaced from the punching station 8 and located at the rear end of the machine frame 4.

FIGS. 1, 3, and 6 to 9 show the magazine unit 22 remote from the punching station 8 in various embodiments. The various embodiments have in common a permanent tool carrier which is constructed as a magazine platform 23 and which has storage locations for punching tools 15. In the examples illustrated, the magazine platform 23 is securely connected to the machine frame 4 at a longitudinal side thereof. A magazine platform 23 which is structurally separate from the machine frame 4 would also be conceivable as an alternative. A decisive aspect for the permanent character of the magazine platform 23 which is provided as a tool carrier is the condition that the magazine platform 23 is permanently accessible to a tool handling device 24, specifically for a tool gripper 25, and/or for a tool gripper 26 of the tool handling device 24, for removing and/or transferring punching tools 15.

In addition to the magazine platform 23 which is permanently accessible to the tool handling device 24, each of the illustrated magazine units 22 remote from the punching station 8 includes a temporary tool carrier 27. The temporary tool carrier 27 also has storage locations for punching tools 15. In contrast to the magazine platform 23, the temporary tool carrier 27 is not permanently, but instead temporarily accessible to the tool handling device 24 in order to remove and/or transfer punching tools 15.

In the case of an embodiment 22-1 of the magazine unit 22 remote from the punching station 8 (as illustrated in FIG. 1), the temporary accessibility of the temporary tool carrier 27 to the tool handling device 24 is achieved in that the temporary tool carrier 27 is provided on a mobile tool carriage 28. Running rollers (not shown) which are provided on the tool carriage 28 are arranged in a concealed manner.

If necessary, the tool carriage 28 is moved with the temporary tool carrier 27 into the position which can be seen in FIG. 1 and in which the temporary tool carrier 27 assumes the operating position thereof and the magazine platform 23 is directly adjacent. If the temporary tool carrier 27 assumes the operating position thereof, the tool handling device 24 can access the storage locations of the temporary tool carrier 27 or punching tools 15 which are arranged thereon. The tool carriage 28 is moved in a position remote from the magazine platform 23 in particular in order to retrofit or refit the temporary tool carrier 27 which is then located in the non-operating position.

In the case of the embodiments 22-2 (FIG. 3), 22-3 (FIG. 6), 22-4 (FIG. 7), 22-5 (FIG. 8), and 22-6 (FIG. 9) of the magazine unit 22 remote from the punching station 8, multiple temporary tool carriers 27 are provided. The temporary tool carriers 27 are in each of these instances a component of a rotating magazine 29 which is constructed in the manner of a paternoster. The various embodiments of the rotating magazine 29 differ in particular owing to their capacity for storing punching tools 15. Differences in the storage capacity of the tool carrier 27 according to FIG. 1 or the rotating magazine 29 according to FIGS. 3 and 6 to 9 result in different storage capacities for the various embodiments 22-1, 22-2, 22-3, 22-4, 22-5, and 22-6 of the magazine unit 22 remote from the punching station 8.

Figure 3:
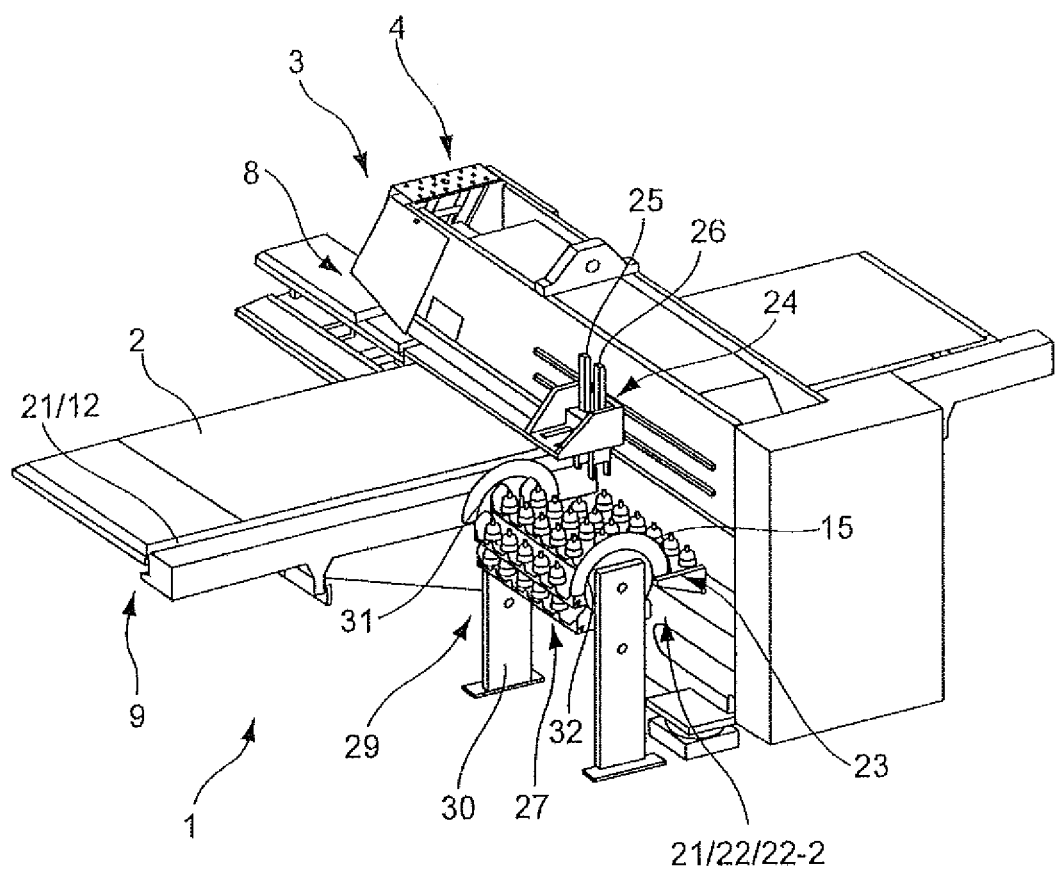
FIG. 3 shows a perspective view of a mechanical arrangement for punch processing sheet metal that includes a punching machine and a tool magazine that has a second embodiment of a magazine unit that is remote from the punching station.
Figure 6:
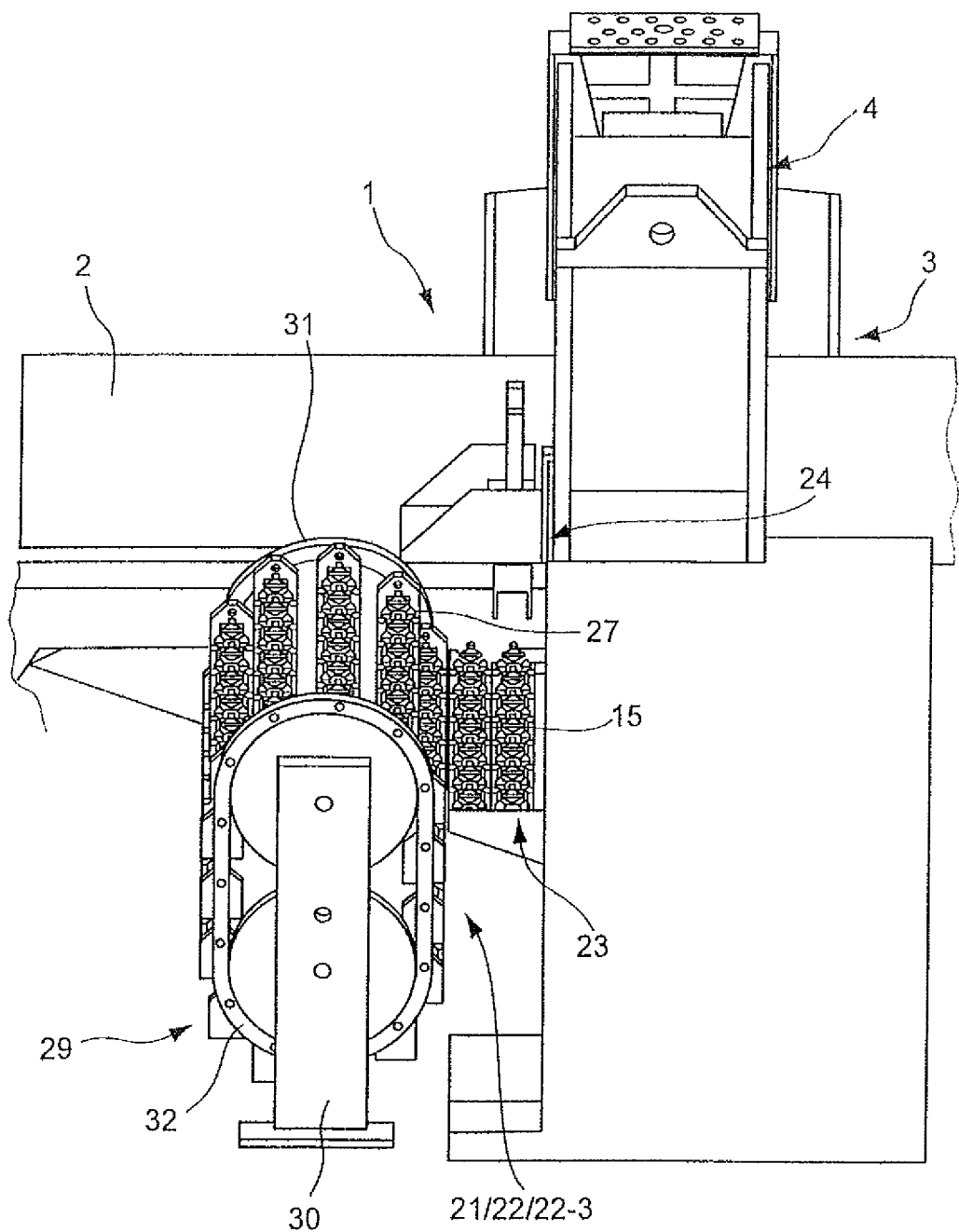
FIG. 6 shows a perspective view of a mechanical arrangement for punch processing sheet metal that includes a punching machine and a tool magazine that has a third embodiment of a magazine unit that is remote from the punching station.
Figure 7:
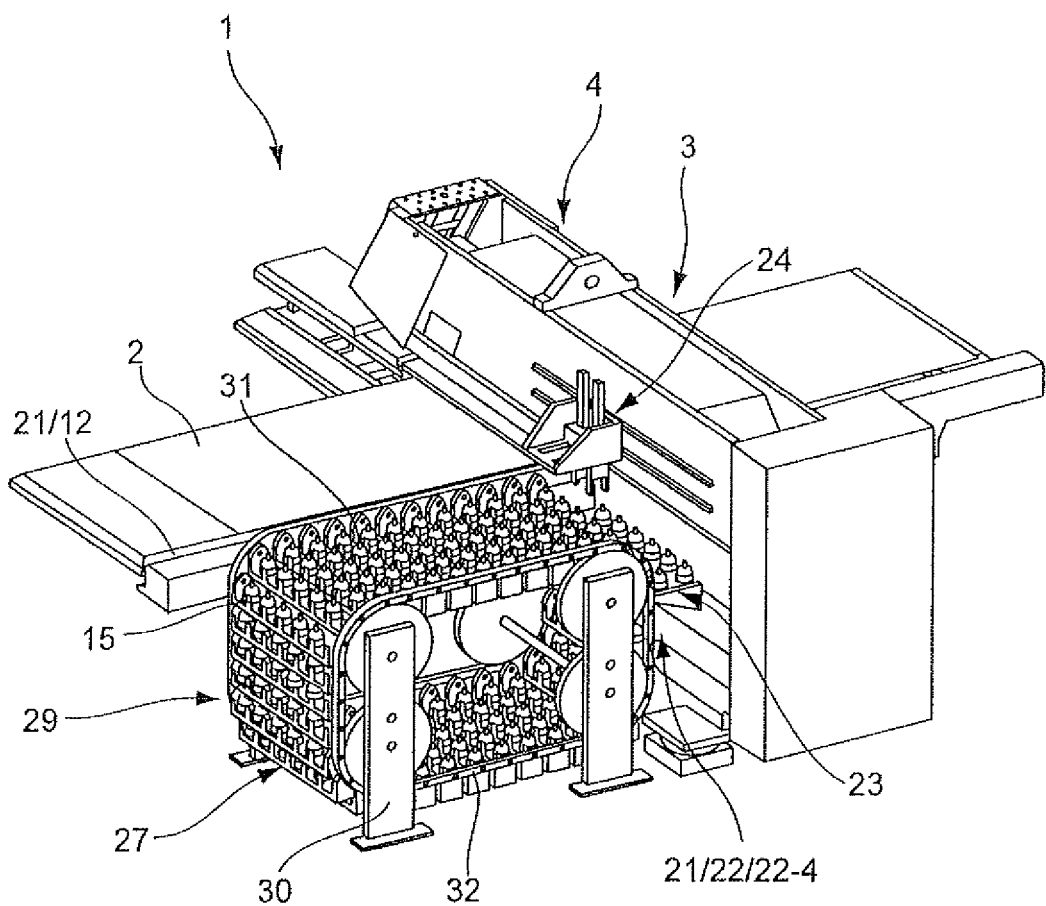
FIG. 7 shows a perspective view of a mechanical arrangement for punch processing sheet metal that includes a punching machine and a tool magazine that has a fourth embodiment of a magazine unit that is remote from the punching station.
Figure 8:
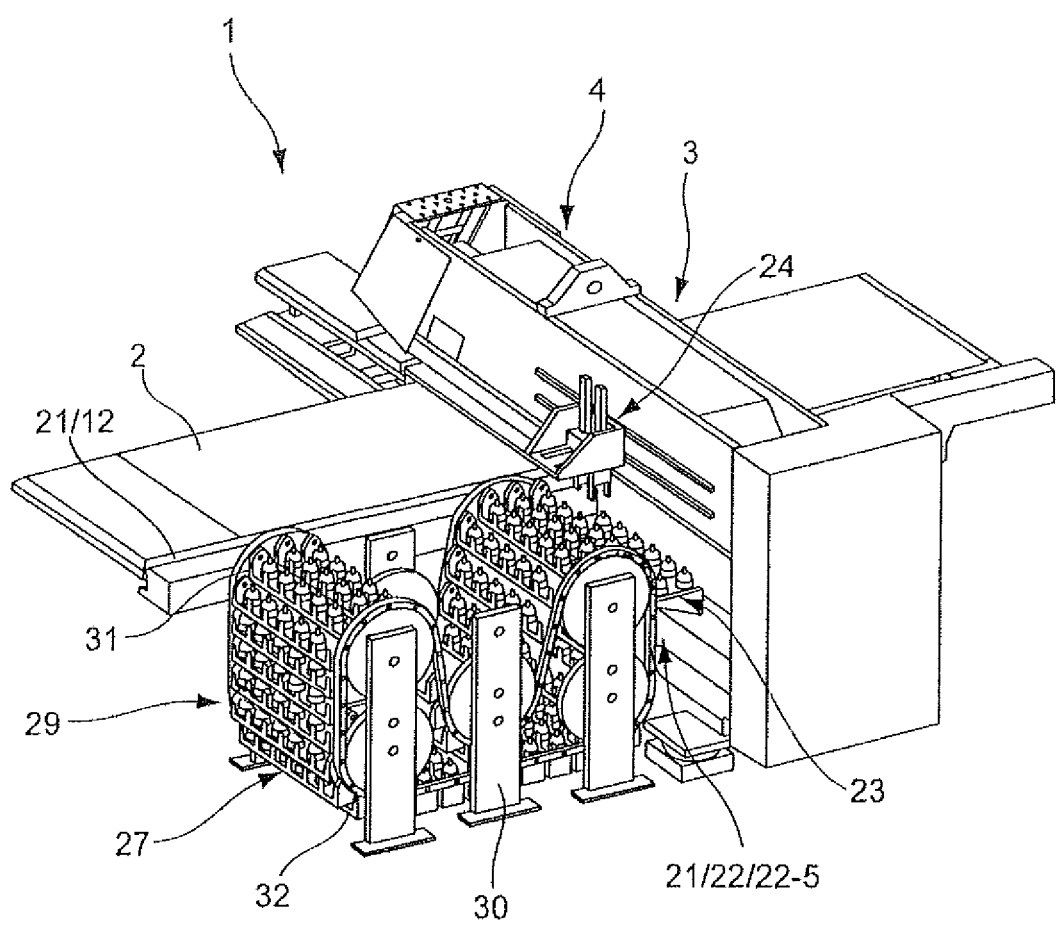
FIG. 8 shows a perspective view of a mechanical arrangement for punch processing sheet metal that includes a punching machine and a tool magazine that has a fifth embodiment of a magazine unit that is remote from the punching station.
Figure 9:
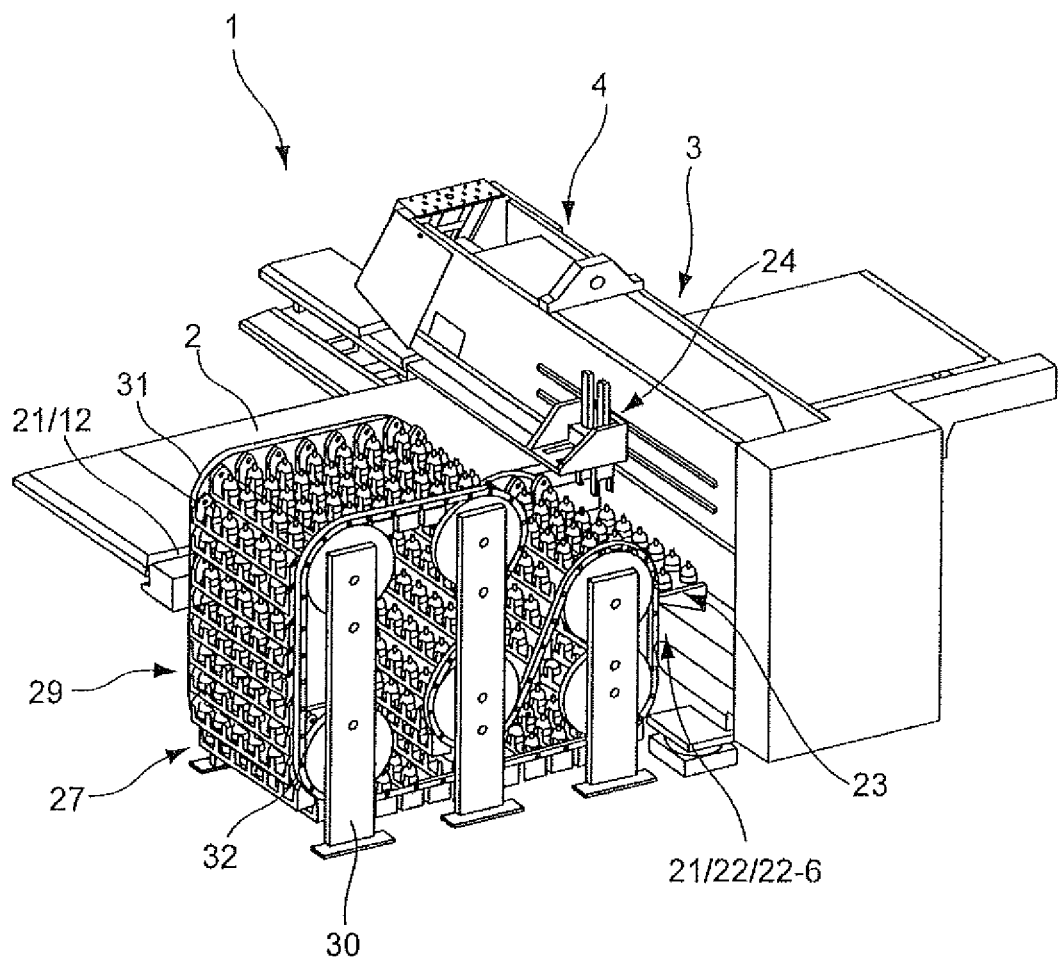
FIG. 9 shows a perspective view of a mechanical arrangement for punch processing sheet metal that includes a punching machine and a tool magazine that has a sixth embodiment of a magazine unit that is remote from the punching station.

Each of the paternoster-like rotating magazines 29 has a carrier structure 30 on which two continuously rotating conveyor chains 31, 32 are guided as conveying system. Depending on the embodiment of the rotating magazine 29, the conveyor chains 31, 32 are directed with varying frequencies. In the case of the embodiment 22-2 of the magazine unit 22 remote from the punching station 8 as illustrated in FIG. 3, there may also be provided in place of the conveyor chains 31, 32 carrier plates. The carrier plates are rotatably supported on the carrier structure 30 about horizontal rotation axes and provide structures to which the temporary tool carriers 27 are journalled with respect to the rotation axes of the carrier plates in an eccentric manner so as to be able to be pivoted about horizontal pivot axes.

The temporary tool carriers 27 which are constructed as gondolas are supported on the conveyor chains 31, 32 in a suspended manner and so as to be able to be pivoted in a limited manner about a horizontal axis. The punching tools 15 are distributed over the gondolas in a uniform manner in order to prevent occurrences of imbalance during the circulation of the gondolas.

Via a drive motor which is not illustrated in detail, the conveyor chains 31, 32 are driven in the rotation direction thereof. A temporary tool carrier 27 is thereby positioned in each case in an operating position in which it is directly adjacent to the magazine platform 23 which acts as a permanent tool carrier. The remaining temporary tool carriers 27 of the rotating magazine 29 at the same time assume a non-operating position in which they are not accessible to the tool handling device 24.

In the operating position, the respective temporary tool carrier 27 is arranged in a defined manner with respect to the magazine platform 23 and also with respect to the tool handling device 24. This applies accordingly to the storage locations of the temporary tool carrier 27 which has been moved into the operating position and the punching tools 15 which are arranged at the storage locations. As can be seen in FIGS. 4 and 5, the punching tools 15 are adapted to the storage locations of the temporary tool carrier 27 in a substantially play-free manner.

A defined mutual spatial association of the temporary tool carrier 27 which has been moved into the operation position, on the one hand, and the magazine platform 23, on the other hand, is achieved in the examples illustrated by a positioning device 33 which is provided for this purpose.

In the example according to FIGS. 4 and 5, the positioning device 33 includes positioning receiving members 34 on the temporary tool carriers 27 and, furthermore, positioning projections (which are not illustrated) on the magazine platform 23. If the temporary tool carrier 27 moves into the operating position, an electromagnet of the positioning device 33 further provided on the magazine platform 23 is activated. Via the electromagnet, the temporary tool carrier 27 which can be pivotably moved in a limited manner is attracted to the magazine platform 23. The positioning receiving members 34 on the temporary tool carrier 27 and the positioning projections on the magazine platform 23 which are associated with the positioning receiving members 34 produce a positive-locking connection between the temporary tool carrier 27 and the magazine platform 23 and in this manner ensure positioning of the temporary tool carrier 27 with the desired arrangement with respect to the magazine platform 23. Consequently, the temporary tool carrier 27 and the storage locations thereof or the punching tools 15 which are stored on the temporary tool carrier 27 are positioned in a defined manner with respect to the entire machine frame 4 and in particular also with respect to the tool handling device 24 provided on the machine frame 4. Also in the coordinate system of a numerical control unit, which controls all the significant functions of the mechanical arrangement 1, the storage locations or punching tools 15 consequently assume a defined position on the temporary tool carrier 27.

The tool handling device 24 includes in addition to the tool grippers 25, 26 a transfer carriage 35 which can move via a motor drive (not illustrated) on guide rails 36, 37 which are secured to the machine frame 4 along the upper frame member 5 of the machine frame 4 (FIG. 1). The tool grippers 25, 26 can be moved on the transfer carriage 35 in the transverse direction of the upper frame leg 5. Furthermore, the tool grippers 25, 26 can be raised and lowered with respect to the transfer carriage 35 in a vertical direction.

In order to process a metal sheet 2, on the upper tool receiving member and on the lower tool receiving member of the punching station 8, the punching tools 15 are introduced and removed using the coordinate guide 9. The movability of the transverse guide 10 in the direction of the double-headed arrow 11 and the movability of the transverse rail 12 in the direction of the double-headed arrow 13 are also used for this purpose. For the tool changing operation, the coordinate guide 9 first approaches the punching station 8 with an empty storage location of the transverse rail 12. The punching tool 15 which is introduced at the punching station 8 is subsequently transferred from the upper tool receiving member and the lower tool receiving member of the punching station 8 to the previously empty storage location of the transverse rail 12. Afterwards, the punching tool 15 which is required for the next processing step and which is stored on the transverse rail 12 is introduced into the upper tool receiving member and into the lower tool receiving member of the punching station 8 via appropriate movement of the coordinate guide 9.

The metal sheet 2 to be processed is secured to the coordinate guide 9 also during the tool change at the punching station 8 and is moved over the workpiece table 20. The punching tools 15 stored at the storage locations of the transverse rail 12 originate from the magazine unit 22 remote from the station. A punching tool set required for the processing task to be carried out is assembled on the transverse rail 12 by the tool handling device 24.

To this end, the transverse guide 10 moves together with the transverse rail 12 into the end position thereof which is located towards the rear end of the machine frame 4. The punching tools 15 required for the imminent metal sheet processing operation are received one after the other on the magazine unit 22 remote from the punching station 8 by the tool handling device 24 and transferred to the transverse rail 12. With each individual tool transfer, the tool handling device 24 moves along the guide rails 36, 37 which are secured to the machine frame 4 first into a tool receiving position above the magazine unit 22 remote from the punching station 8. The tool gripper 25, 26 of the tool handling device 24 used for the tool transfer is subsequently lowered in a vertical direction to such an extent that it can grip the punching tool 15 to be transferred. If necessary, the tool gripper 25, 26 also carries out beforehand a movement in the transverse direction of the upper frame member 5. It is also possible to use both tool grippers 25, 26 at the same time for the transfer of two punching tools 15.

When a single punching tool 15 is transferred, the tool gripper 25, 26 is raised together with the punching tool 15 which is retained thereon and, by moving the tool handling device 24 along the guide rails 36, 37, is moved into a tool transfer position above the storage location provided for the punching tool 15 on the transverse rail 12. By lowering the tool gripper 25, 26 again, the punching tool 15 retained thereon is transferred to the associated storage location of the transverse rail 12. Accordingly, the punching tools 15 of the completed processing operation which are no longer required are transferred from the transverse rail 12 to the magazine unit 22 remote from the punching station 8.

During the displacement movement of the tool handling device 24 along the upper frame leg 5, the tool gripper 25, 26 with the punching tool 15 to be transferred is located in the end position thereof close to the frame. In this manner, mass-related forces (e.g., mass-distance-related forces, such as torques) which would occur if the tool gripper 25, 26 were further away from the machine frame 4 during its movement along the machine frame 4 are prevented.

In order to minimize the path length or the duration of the tool transfer between the portion of the magazine unit 22 remote from the punching station 8 and the portion of the magazine unit 22 close to the punching station 8 (that is to say, the transverse rail 12), the tool handling device 24 may travel to the magazine platform 23 of the magazine unit 22 remote from the punching station 8. The magazine platform 23 should therefore, if possible, be provided with those punching tools 15 by which the punching tool set is to be composed for the next metal sheet processing operation or should have a sufficient number of free storage locations in order to be able to receive the punching tools 15 which were used during the previous metal sheet processing operation and which are no longer required. Such a configuration of the magazine platform 23 can be achieved in parallel with primary processing time, that is to say, during a metal sheet processing operation.

The punching tools 15 which are required for the subsequent metal sheet processing operation and which are not yet located on the magazine platform 23 are provided in this instance by the temporary tool carrier 27. To this end, the temporary tool carrier 27 is provided with the relevant punching tools 15 in a non-operating position located remote from the operating position and subsequently moved into the operating position close to the magazine platform 23. Whilst a metal sheet 2 is still being processed on the punching station 8, the tool handling device 24 can remove the punching tools 15 which are required for the next metal sheet processing operation and which are not yet available at the magazine platform 23 from the temporary tool carrier 27 which is arranged in the operating position and transfer them to the magazine platform 23.

If storage locations on the magazine platform 23 are intended to be emptied for subsequently receiving punching tools 15 which are used in the current metal sheet processing operation and which are intended to be transferred from the transverse rail 12 to the magazine unit 22 remote from the punching station 8 after the current metal sheet processing operation has been completed, punching tools 15 which are not required for the subsequent metal sheet processing operation are transferred by the tool handling device 24 from the magazine platform 23 to the temporary tool carrier 27 which is located in the operating position and on which the storage locations required to receive the relevant punching tools 15 have previously been emptied.

In the manner described, it is ensured that, when a metal sheet processing operation is complete, the punching tools 15 required for the subsequent metal sheet processing operation are already available on the magazine platform 23 and the punching tool set stored on the transverse rail 12 for the completed metal sheet processing operation can be exchanged immediately for the punching tool set required for the subsequent metal sheet processing operation.

In a variation of the procedure described, it is also possible for the tool handling device 24, during the tool transfer between the transverse rail 12 and the magazine unit 22 remote from the punching station 8, to directly access the temporary tool carrier 27 of the magazine unit 22 remote from the punching station 8, which tool carrier 27 has been moved into the operating position. Punching tools 15 can be received via the tool handling device 24 on the temporary tool carrier 27 and transferred directly to the transverse rail 12. It is also conceivable for punching tools 15 which are no longer required on the transverse rail 12 to be received by the tool handling device 24 and to be transferred directly onto the temporary tool carrier 27 which is located in the operating position without being deposited temporarily on the magazine platform 23.

Punching tools 15 which are intended to be discharged from the tool stock of the tool magazine 21 of the punching machine 3, for example, owing to wear, can, after they have been transferred from the transverse rail 12 to the magazine platform 23, be transferred from the magazine platform 23 to a temporary tool carrier 27 during the primary processing time. In this instance, it is possible to provide one or more temporary tool carriers 27 specifically to collect punching tools 15 which are intended to be discharged. After the punching tools 15 to be discharged have been transferred to the relevant temporary tool carrier 27, the temporary tool carrier 27 can be moved from the operating position into the non-operating position, in which it is accessible for an operator in order to remove the punching tools 15 which are intended to be discharged.

The invention claimed is:

1. A tool magazine for tools of a machine tool for processing workpieces, the tool magazine comprising:
    a first magazine unit that comprises storage locations for tools that are transferred from the first magazine unit to a processing station of the machine tool and/or that are transferred from the processing station of the machine tool to the first magazine unit;
    a second magazine unit; and
    a tool handler;
    wherein the first magazine unit is arranged closer than the second magazine unit is to the processing station of the machine tool;
    wherein the second magazine unit comprises a permanent tool carrier being permanently accessible for the tool handler for removing the tools from and/or for transferring the tools to the permanent tool carrier, and the second magazine unit further comprises a rotating magazine, the rotating magazine including a carrier structure, a conveying means and a plurality of temporary tool carriers connected to the conveying means and guided on the carrier structure, each of the permanent tool carrier and each temporary tool carrier of the plurality of temporary tool carriers comprising plural storage locations, each storage location for storing a respective one of the tools that are transferred from the second magazine unit to the first magazine unit for subsequent transfer to the processing station of the machine tool and/or the tools that are transferred from the first magazine unit to the second magazine unit after being removed from the processing station;
    wherein the conveying means of the rotating magazine is driven in a movement direction and the plurality of temporary tool carriers of the rotating magazine thereby moved into an operating position and a non-operating position, a temporary tool carrier of the plurality of temporary tool carriers in the operating position being, in addition to the permanent tool carrier of the second magazine unit, accessible for the tool handler for removing the tools from and/or for transferring the tools to the temporary tool carrier in the operating position and the temporary tool carrier of the plurality of temporary tool carriers in the non-operating position not being accessible for the tool handler for removing the tools from and/or for transferring the tools to the temporary tool carrier in the non-operating position; and wherein the tool handler is configured as a tool transfer device by which the tools that are provided for subsequent transfer to the processing station of the machine tool can be transferred from the permanent tool carrier of the second magazine unit to the first magazine unit or from the temporary tool carrier of the plurality of temporary tool carriers of the second magazine unit in the operating position to the first magazine unit and/or by which the tools removed from the processing station can be transferred from the first magazine unit to the permanent tool carrier of the second magazine unit or from the first magazine unit to the temporary tool carrier of the plurality of temporary tool carriers of the second magazine unit in the operating position;

wherein the rotating magazine of the second magazine unit is designed as a paternoster comprising the carrier structure of the rotating magazine and a continuously rotating conveying means as the conveying means of the rotating magazine;

wherein the plurality of temporary tool carriers are connected to the continuously rotating conveying means with the continuously rotating conveying means on the paternoster being driven and the plurality of temporary tool carriers of the rotating magazine thereby moved on the paternoster in a vertical movement direction from the non-operating position into the operating position and/or from the operating position into the non-operating position;

wherein two continuously rotating conveyor chains or two continuously rotating conveyor belts are provided as the continuously rotating conveying means and guided on the carrier structure with the continuously rotating conveyor chains or the continuously rotating conveyor belts being redirected twice through a 180° turn and linearly guided between the 180° turns; and wherein the plurality of temporary tool carriers of the rotating magazine in the operating position are arranged on the paternoster where the two continuously rotating conveyor chains or the two continuously rotating conveyor belts are linearly guided on the carrier structure.

2. The tool magazine according to claim 1, wherein the plurality of temporary tool carriers of the paternoster in the operating position are arranged in a position that is defined with respect to the permanent tool carrier of the second magazine unit and/or with respect to the tool handler.

3. The tool magazine according to claim 2, wherein there is provided an activatable and deactivatable positioner, by which the plurality of temporary tool carriers of the paternoster in the operating position are arranged in the position that is defined with respect to the permanent tool carrier of the second magazine unit and/or with respect to the tool handler.

4. The tool magazine according to claim 3, wherein the activatable and deactivatable positioner comprises a switchable magnet connection between the permanent tool carrier of the second magazine unit and the temporary tool carrier of the plurality of temporary tool carriers in the operating position, and/or wherein the activatable and deactivatable positioner comprises respective guide members on the permanent tool carrier of the second magazine unit and on each of the plurality of temporary tool carriers, and when the temporary tool carrier of the plurality of temporary tool carriers moves into the operating position, the respective guide members on the permanent tool carrier and the respective guide members of the temporary tool carrier of the plurality of temporary tool carriers moved into the operating position form a specific guide which becomes effective.

5. The tool magazine according to claim 1, wherein the plurality of temporary tool carriers are guided on the carrier structure of the paternoster by the continuously rotating conveying means that is guided on the carrier structure of the paternoster in the vertical movement direction.

6. The tool magazine according to claim 1, wherein the plurality of temporary tool carriers of the paternoster are in the form of gondolas that are suspended on the conveying means.

7. The tool magazine according to claim 1, wherein the plural storage locations for the tools provided on each of the plurality of temporary tool carriers of the paternoster are distributed in a uniform manner over each of the plurality of temporary tool carriers.

8. A mechanical arrangement for processing workpieces, the mechanical arrangement comprising:

a machine tool that has a processing station to and from which tools can be transferred for a workpiece processing operation and the mechanical arrangement further comprising a tool magazine, the tool magazine comprising:

a first magazine unit that comprises storage locations for tools that are transferred from the first magazine unit to the processing station of the machine tool and/or for tools that are transferred from the processing station of the machine tool to the first magazine unit;

a second magazine unit; and a tool handler;

wherein the first magazine unit is arranged closer than the second magazine unit is to the processing station of the machine tool;

wherein the second magazine unit comprises a permanent tool carrier being permanently accessible for the tool handler for removing the tools from and/or for transferring the tools to the permanent tool carrier, and the second magazine unit further comprises a rotating magazine, the rotating magazine including a carrier structure, a conveying means, and a plurality of temporary tool carriers connected to the conveying means and guided on the carrier structure, each of the permanent tool carrier and each temporary tool carrier of the plurality of temporary tool carriers comprising plural storage locations, each storage location for storing a respective one of the tools that are transferred from the second magazine unit to the first magazine unit for subsequent transfer to the processing station of the machine tool and/or the tools that are transferred from the first magazine unit to the second magazine unit after being removed from the processing station;

wherein the conveying means of the rotating magazine is driven and the plurality of temporary tool carriers of the rotating magazine are thereby moved in a movement direction into an operating position and a non-operating position, a temporary tool carrier of the plurality of temporary tool carriers in the operating position being, in addition to the permanent tool carrier of the second magazine unit, accessible for the tool handler for removing the tools from and/or for transferring the tools to the temporary tool carrier in the operating position and the temporary tool carrier of the plurality of temporary tool carriers in the non-operating position not being accessible for the tool handler for removing the tools from and/or for transferring the tools to the temporary tool carrier in the non-operating position;

wherein the tool handler is configured as a tool transfer device by which the tools that are provided for subsequent transfer to the processing station of the machine tool can be transferred from the permanent tool carrier of the second magazine unit to the first magazine unit or from the temporary tool carrier of the plurality of temporary tool carriers of the second magazine unit in the operating position to the first magazine unit and/or by which the tools removed from the processing station can be transferred from the first magazine unit to the permanent tool carrier of the second magazine unit or from the first magazine unit to the temporary tool carrier of the plurality of temporary tool carriers of the second magazine unit in the operating position;

wherein the rotating magazine of the second magazine unit is designed as a paternoster comprising the carrier structure of the rotating magazine and a continuously rotating conveying means as the conveying means of the rotating magazine;

wherein the plurality of temporary tool carriers are connected to the continuously rotating conveying means with the continuously rotating conveying means on the paternoster being driven and the plurality of temporary tool carriers of the rotating magazine thereby moved on the paternoster in a vertical movement direction from the non-operating position into the operating position and/or from the operating position into the non-operating position;

wherein two continuously rotating conveyor chains or two continuously rotating conveyor belts are provided as the continuously rotating conveying means and guided on the carrier structure with the continuously rotating conveyor chains or the continuously rotating conveyor belts being redirected twice through a 180° turn and linearly guided between the 180° turns; and wherein the plurality of temporary tool carriers of the rotating magazine in the operating position are arranged on the paternoster where the two continuously rotating conveyor chains or the two continuously rotating conveyor belts are linearly guided on the carrier structure.

9. The mechanical arrangement according to claim 8, wherein the processing station is provided on a machine frame of the machine tool which has an upper frame leg, a lower frame leg and an intermediate leg space which is formed between the upper frame leg and the lower frame leg, wherein the first magazine unit is arranged at least partially in the intermediate leg space of the machine frame, wherein the second magazine unit is spaced from the first magazine unit outside the intermediate leg space of the machine frame; and wherein the second magazine unit has as the permanent tool carrier a magazine platform relative to which the plurality of temporary tool carriers of the second magazine unit can be moved into the operating position and into the non-operating position.

10. The mechanical arrangement according to claim 8, wherein the tool handler, for which the permanent tool carrier of the second magazine unit is permanently accessible and the plurality of temporary tool carriers of the second magazine unit are temporarily accessible, is configured as the tool transfer device by which the tools which are provided for subsequent transfer to the processing station of the machine tool can be transferred from the temporary tool carrier of the plurality of temporary tool carriers of the second magazine unit in the operating position to the permanent tool carrier of the second magazine unit and/or by which the tools removed from the processing station can be transferred from the permanent tool carrier of the second magazine unit to the temporary tool carrier of the plurality of temporary tool carriers of the second magazine unit in the operating position.

* * * * *